United States Patent
Nelson et al.

(10) Patent No.: US 10,391,958 B2
(45) Date of Patent: Aug. 27, 2019

(54) METHODS AND SYSTEMS TO CUSTOMIZE A VEHICLE COMPUTING SYSTEM BASED ON AN ELECTRONIC CALENDAR

(71) Applicant: Ford Global Technologies, LLC, Dearborn, MI (US)

(72) Inventors: Thomas Nelson, Plymouth, MI (US); David Anthony Hatton, Berkley, MI (US); Hussein F. Nasrallah, Dearborn Heights, MI (US); Thomas E. Apczynski, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 531 days.

(21) Appl. No.: 14/813,813

(22) Filed: Jul. 30, 2015

(65) Prior Publication Data

US 2017/0028949 A1   Feb. 2, 2017

(51) Int. Cl.
*B60R 16/037* (2006.01)
*G01C 21/36* (2006.01)
*G01C 21/20* (2006.01)

(52) U.S. Cl.
CPC ............ *B60R 16/037* (2013.01); *G01C 21/20* (2013.01); *G01C 21/362* (2013.01)

(58) Field of Classification Search
CPC ...... B60R 16/037; G01C 21/20; B60Q 3/0293
See application file for complete search history.

(56) References Cited

U.S. PATENT DOCUMENTS

| | | | |
|---|---|---|---|
| 8,520,820 | B2 | 8/2013 | Lai |
| 2011/0281562 | A1 | 11/2011 | Videtich |
| 2013/0030645 | A1 | 1/2013 | Divine et al. |
| 2014/0164559 | A1 | 6/2014 | Demeniuk |
| 2016/0167608 | A1* | 6/2016 | Rai ....................... H04L 67/306 701/36 |

* cited by examiner

*Primary Examiner* — Jelani A Smith
*Assistant Examiner* — Kelly D Williams
(74) *Attorney, Agent, or Firm* — Michael Spenner; Brooks Kushman P.C.

(57) ABSTRACT

A vehicle system includes a processor in communication with a nomadic device and programmed to receive calendar information from the nomadic device, parse the calendar information for a calendar entry based on a predefined time window, and adjust, by the processor, a vehicle setting for a vehicle feature associated with one or more categorized items correlated with the calendar entry.

10 Claims, 5 Drawing Sheets

METHODS AND SYSTEMS TO CUSTOMIZE A VEHICLE COMPUTING SYSTEM BASED ON AN ELECTRONIC CALENDAR

TECHNICAL FIELD

The present disclosure generally relates to vehicle infotainment systems and customizing the vehicle infotainment systems.

BACKGROUND

A vehicle infotainment system is used to provide several features and functions including navigation information and music to an occupant while traveling to a destination. The vehicle infotainment system provides settings to allow configuration of the features and functions based on occupants' preferences. The settings may be manually configured once the occupant enters the vehicle. For example, a new destination may be entered into a navigation system by the vehicle occupant to provide navigation directions.

The vehicle infotainment system may receive additional features and functions from a connected device such as a smartphone provided by application developers. For example, these features and functions have included fitness, music, and navigation applications. The smartphone features and functions may be integrated with the vehicle infotainment system. The smartphone communicating with the vehicle infotainment system may bring additional features and functions to the vehicle occupant. The settings for the smartphone features and functions may be manually adjusted at the smartphone or the vehicle infotainment system.

SUMMARY

In at least one embodiment, a vehicle computing system includes a processor programmed to communicate with a calendar belonging to an occupant and to adjust a vehicle setting based on a calendar entry. The processor is further programmed to parse through the calendar for the calendar entry based on a predefined time window. The processor is further programmed to recognize one or more categorized items based on the calendar entry. The processor is further programmed to transmit a request for information related to the one or more categorized items. The processor is further programmed to adjust a vehicle setting based on the received additional information.

In at least one embodiment, a vehicle configuration method for adjusting a vehicle setting based on a calendar entry for a recognized occupant includes recognizing, via a vehicle system, an occupant based on a nomadic device and requesting a calendar entry based on a predefined time window from the nomadic device. The method further includes recognizing a categorized item based on the calendar entry, transmitting a request for information related to the categorized item, and presenting a message via a vehicle display to accept an adjustment of a vehicle setting based on the received information.

In at least one embodiment, a computer-program product embodied in a non-transitory computer readable medium that is programmed for a vehicle processor comprises instructions for parsing through a calendar for a calendar entry based on a predefined window. The computer-program product includes further instructions for recognizing one or more categorized items based on the calendar entry, transmitting a request for information related to the one or more categorized items, and adjusting a vehicle setting based on the received information.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The disclosure relates to a vehicle computing system (VCS) configured to prepare vehicle settings for features and functions based on a calendar entry associated with a vehicle occupant. The vehicle settings may be prepared based on information provided in the calendar entry. The VCS may retrieve the calendar entry from a calendar associated with an identified vehicle occupant. The VCS may identify the vehicle occupant based on several methods including a paired mobile device, biometrics, an assigned key, and/or a combination thereof.

The VCS may parse the calendar entry to extract information that may include a location, one or more attendees, a subject, description etc. The information related to the vehicle occupant's calendar entry may enable the VCS to configure one or more vehicle settings. The VCS may request additional information based on one or more categories of the calendar entry. The VCS may retrieve the additional information from local memory, a connected device, a server, and/or a combination thereof.

In one example, the VCS may recognize an attendee from the calendar entry and request additional information associated with the recognized attendee. The VCS may receive the additional information from the connected mobile device (such as a smartphone). The additional information may include the recognized attendee's contact list, calendar, email, or other smartphone applications. The VCS may adjust and configure vehicle settings of available features and functions based on the additional information.

In another example, the VCS may configure one or more vehicle features and/or functions based on the calendar entry of the vehicle occupant. The calendar entry may be entitled "date night with wife." The calendar entry may include, but is not limited to, the attendee, a destination, a time, a date and/or a combination thereof. The calendar entry may be scheduled to occur while the vehicle occupant is in the vehicle. The VCS may transmit a request to the vehicle occupant to configure one or more settings based on the "date night with spouse or signification other" scheduled event logged as the calendar entry. The VCS may output the request to configure one or more vehicle settings based on the calendar entry at a display.

Continuing from the example, an attendee for the "date night with wife" calendar entry associated with the occupant may include the wife's name, the wife's email address, and/or a combination thereof. The VCS 1 may retrieve the wife's personal information stored at the server via the wife's name, email, and/or combination thereof. The VCS may precondition one or more settings based on the calendar entry (location for the calendar entry, for example) and the wife's personal information (seat setting, music preference, etc., for example). In another example, in response to the wife being an attendee for the calendar entry, the VCS may enable the wife's mobile device to be the primary device once recognized by the system. The VCS may retrieve the wife's personal information from the wife's mobile device via an established communication connection. For example, the VCS may configure the one or more vehicle features and functions based on a play list received from the wife's mobile device and navigation directions received from the calendar entry. The calendar information and the attendees associated with the calendar entry may configure other settings including seat settings, ambient lighting, and climate control.

Figure 1:
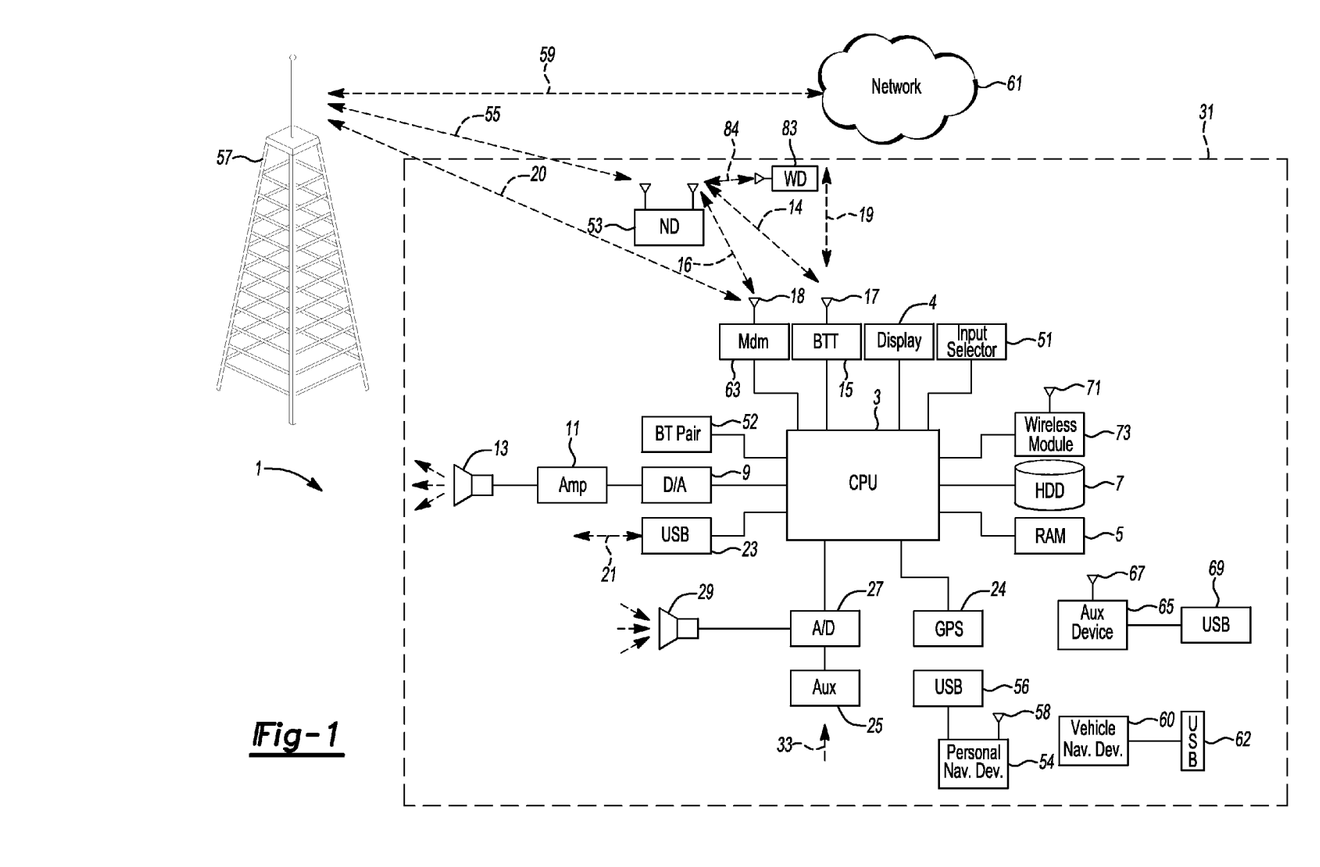
FIG. 1 is a representative block topology of a vehicle computing system implementing a user-interactive vehicle information display system according to an embodiment.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor 3 is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system may include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (cell phone, smart phone, PDA, or any other device having wireless remote network connectivity, for example). The nomadic device can then be used to communicate 59 with a network 61 outside the vehicle 31 through, for example, communication 55 with a cellular tower 57. In some embodiments, tower 57 may be a WiFi access point. The nomadic device 53 may also be used to communicate 84 with an accessory device such as a wearable device 83 (smartwatch, smart glasses, etc., for example). The nomadic device 53 may communicate 84 one or more control functions to the wearable device 83. For example, the nomadic device 53 may enable the wearable device 83 to accept a phone call, enable a mobile application, receive notifications, and/or a combination thereof. In another example, the wearable device 83 may transmit vehicle control features/functions to the VCS 1 based on one or more mobile applications executed at the nomadic device 53.

Communication between the nomadic device and the BLUETOOTH transceiver is represented by signal 14. Pairing a nomadic device 53 and the BLUETOOTH transceiver 15 can be instructed through a button 52 or similar input. Accordingly, the CPU 3 is instructed so that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having an antenna 18 in order to communicate 16 data between CPU 3 and network 61 over the voice band. The nomadic device 53 may then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the nomadic device 53 includes a modem for voice band or broadband data communication. In the data-over-voice embodiment, a technique known as frequency division multiplexing may be implemented when the owner of the nomadic device 53 can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device 53, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 3 could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU 3 could be connected to a vehicle based wireless router 73, using for example a WiFi (IEEE 803.11) 71 transceiver. This could allow the CPU 3 to connect to remote networks in range of the local router 73.

In addition to having representative processes executed by a VCS 1 located in a vehicle, in certain embodiments, the processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process includes sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the processes.

Figure 2:
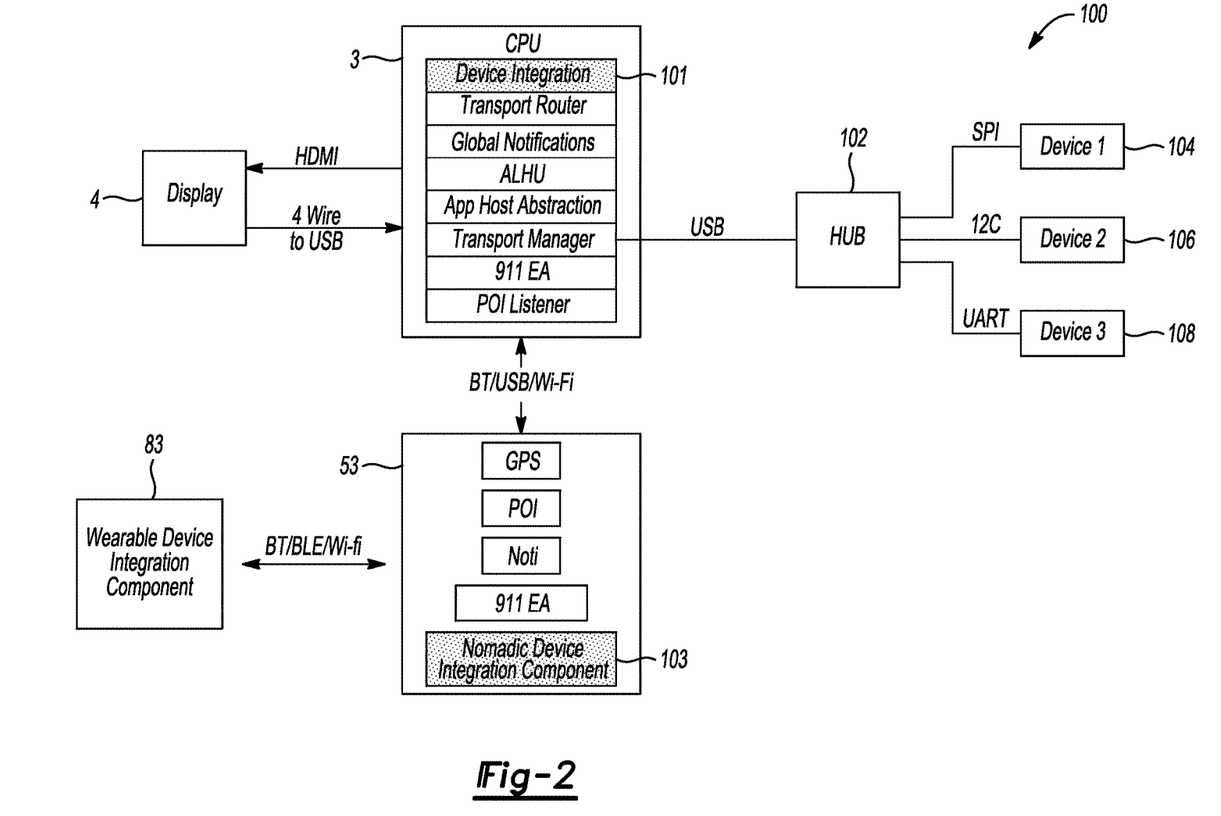
FIG. 2 is a representative topology of a system for integrating one or more connected devices with the vehicle computing system according to an embodiment.

FIG. 2 is a representative block topology of a system 100 for integrating one or more connected devices with the VCS 1. The CPU 3 may be in communication with one or more transceivers. The one or more transceivers are capable of wired and wireless communication for the integration of one or more devices. To facilitate the integration, the CPU 3 may include a device integration framework 101 configured to provide various services to the connected devices. These services may include transport routing of messages between the connected devices and the CPU 3, global notification services to allow connected devices to provide alerts to the user, application launch and management facilities to allow for unified access to applications executed by the CPU 3 and those executed by the connected devices, accident detection notification (911 ASSIST™, that is), vehicle access control (locking and unlocking the vehicle doors, for example), and point of interest location and management services for various possible vehicle 31 destinations.

As mentioned above, the CPU 3 of the VCS 1 may be configured to interface with one or more nomadic devices 53 of various types. The nomadic device 53 may further include a device integration client component 103 to allow the nomadic device 53 (smartphone, for example) to take advantage of the services provided by the device integration framework 101. The device integration client component 103 may be referred to as an application. The application is executed on hardware of the nomadic device 53. The application may communicate data from the nomadic device 53 to the VCS 1 via the transceiver.

The nomadic device 53 may communicate application data with a wearable device 83 via wireless technology. The wireless technology may include Bluetooth Low Energy (BLE). The wearable device 83 may receive application data executed at the nomadic device 53 using a wearable device integration component. The wearable device integration component may allow the wearable device 83 to take advantage of the services provided by the device integration framework 101 and the device integration client component 103. For example, the wearable device 83 may receive application data including one or more control functions for the vehicle. The wearable device 83 may receive one or more control function inputs via a user interface and transmit the inputs to the nomadic device 53. In one example, the wearable device 83 may receive a control function request such as a configuration of a vehicle setting based on the VCS parsing calendar information. The wearable device 83 may transmit an acceptance of the configuration request to the CPU 3 via the nomadic device 53.

The one or more transceivers may include a multiport connector hub 102. The multiport connector hub 102 may be used to interface between the CPU 3 and additional types of connected devices other than the nomadic devices 53. The multiport connector hub 102 may communicate with the CPU 3 over various buses and protocols, such as via USB, and may further communicate with the connected devices using various other connection buses and protocols, such as Serial Peripheral Interface Bus (SPI), Inter-integrated circuit (I2C), and/or Universal Asynchronous Receiver/Transmitter (UART). The multiport connector hub 102 may further perform communication protocol translation and interworking services between the protocols used by the connected devices and the protocol used between the multiport connector hub 102 and the CPU 3. The connected devices may include, as some non-limiting examples, a radar detector 104, a global position receiver device 106, and a storage device 108.

Figure 3:
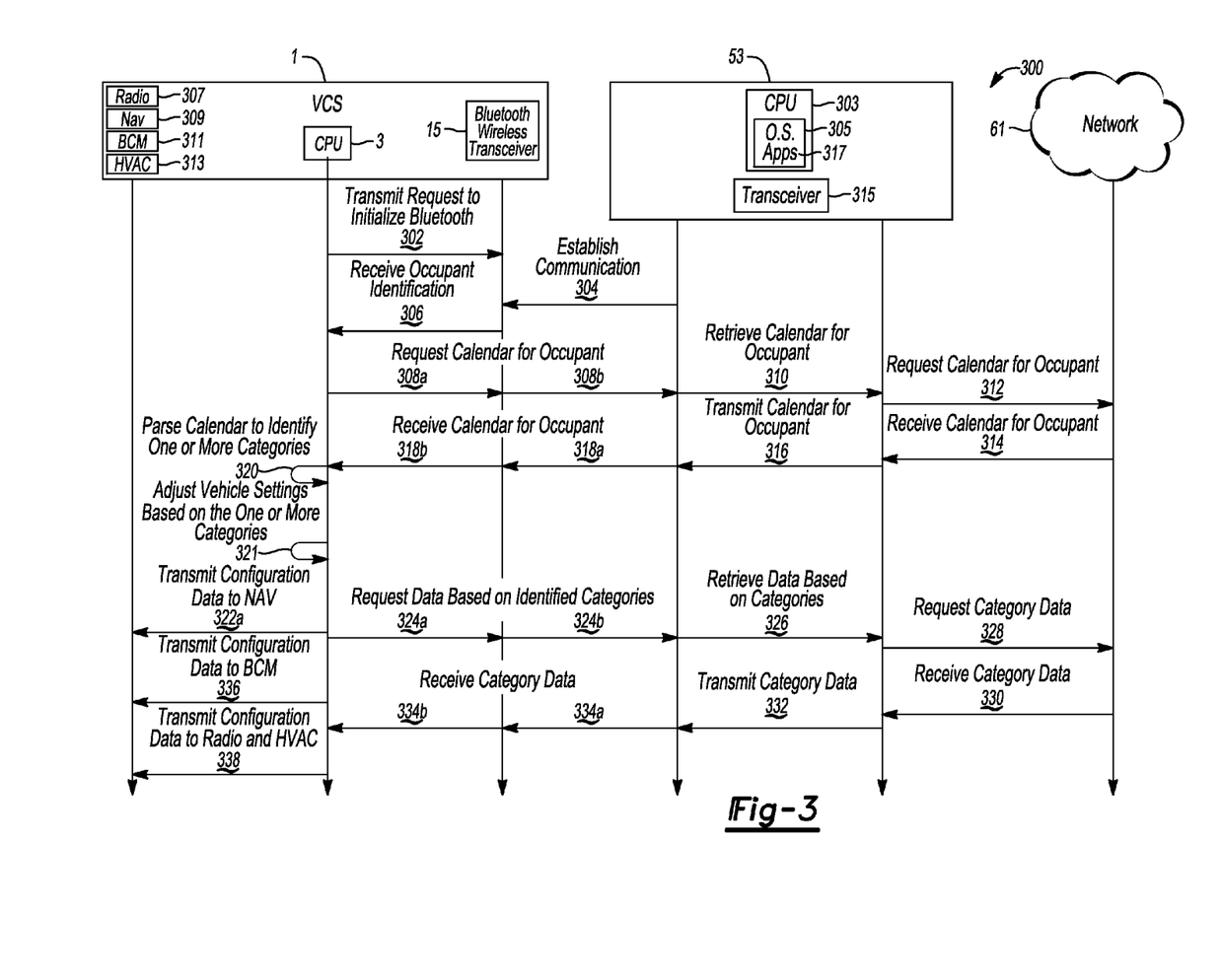
FIG. 3 is a flow chart illustrating an example method of the vehicle computing system configuring one or more vehicle settings based on a calendar entry according to an embodiment.

FIG. 3 is a flow chart illustrating an example method 300 of the VCS 1 configuring one or more vehicle settings based on a calendar entry of an occupant. The one or more vehicle settings for the features and functions may reside on several control modules including, but not limited to, a radio control module 307, a navigation control module 309, a body control module (BCM) 311, and a heating, ventilation and air conditioning module (HVAC) 313.

The VCS 1 may establish a wireless connection with the nomadic device 53 belonging to the occupant. The nomadic device 53 may have a processor 303 configured to execute an operating system 305 and a transceiver 315 configured to communicate with the VCS 1. The VCS 1 may communicate with one or more applications 317 being executed on the nomadic device processor 303. For example, the one or more applications 317 may include, but are not limited to, Gmail™, Facebook™, Microsoft Outlook™ and a combination thereof. The one or more applications 317 may include calendar information associated with the occupant. The VCS 1 may communicate with the one or more applications 317 having the occupant's calendar information.

The VCS 1 may transmit a request to initialize 302 the Bluetooth wireless transceiver 15. The Bluetooth wireless transceiver 15 may broadcast a wireless protocol 304, such as BLUETOOTH, to provide a means of communicating with the nomadic device 53. The nomadic device 53 may establish communication 304 with the VCS 1 via the nomadic device transceiver 315. In one example, the nomadic device 53 may provide a unique identification code stored in the operating system software 305, the one or more applications 317, or a combination thereof.

The VCS 1 may receive an occupant identification 306 based on the unique identification code. In one example, the VCS 1 may recognize the occupant based on the previously paired nomadic device 53 belonging to the occupant. The vehicle processor 3 may request calendar information for the occupant 308a based on the occupant identification. The VCS 1 may transmit the calendar request for the occupant 308b to the nomadic device 53 via the transceiver 15. The nomadic device 53 may retrieve the calendar for the occupant 310 from the one or more applications 317 being executed on the nomadic device processor 303.

In one example, the one or more applications 317 may receive the request and begin to search for the calendar. In another example, the nomadic device processor 303 may transmit a request to retrieve the calendar associated with the occupant stored at a remote network (server, for example) 61. The remote network 61 may be configured to store the occupant's calendar associated with the one or more applications. The nomadic device 53 may request the calendar for the occupant 312 from the remote network 61, receive the calendar for the occupant 314 from the remote network 61, and transmit the calendar for the occupant 316 to the VCS 1 via the nomadic device transceiver 315.

The VCS 1 may receive the calendar associated with the occupant 318a 318b (herein known as 318). The VCS 1 may parse the calendar to identify one or more categories 320 related to the vehicle features and functions. For example, the one or more categories may include destination information, attendees (meeting participants, for example), subject of event, and/or a combination thereof.

The VCS 1 may adjust the vehicle features and functions via configurable settings based on the one or more categories 321. For example, the VCS 1 may recognize that the destination information is an address, a business name, or a combination thereof. The VCS 1 may transmit configuration data to the navigation module 322a to update navigation settings based on the address. The navigation module 309 may configure the navigation setting so that directions to the address are presented to the occupant.

In another example, a trip time may be calculated by the VCS 1 based on an amount of time it may take to arrive to the address based on the vehicle's current location. The VCS 1 may compare the trip time to a time slot for the calendar entry scheduled in the calendar, and may determine whether to begin presenting the navigation directions for the address based on the trip time being within a predefined time window for the scheduled time of the calendar entry.

In response to the identified one or more categories of information, the VCS 1 may generate one or more message requesting for category data based on the identified categories 324a. The VCS 1 may transmit a request for the category data based on the identified categories 324b to the nomadic device 53 via the transceiver 15. The nomadic device 53 may retrieve 326 the requested data based on the identified categories from the one or more applications 317 being executed at the nomadic device processor 303. In response to the requested data being at a server, the nomadic device 53 may request category data 328 from the remote server 61.

For example, the category data may be associated with an attendee of the calendar entry. The attendee may be recognized by the VCS 1 based on a unique identification, email address, a user name, and/or combination thereof. The recognized attendee may have a profile comprising one or more vehicle settings stored at the remote server 61. The remote server 61 may retrieve the one or more vehicle settings stored for the recognized attendee. The remote server 61 may transmit the received category data 330 for the attendee to the nomadic device 53. The nomadic device 53 may transmit the category data 332 retrieved from the remote server 61 to the VCS 1.

The VCS 1 may receive the category data from the nomadic device 334a 334b (herein known as 334) via the transceiver 15, and transmit configuration data to one or more vehicle modules based on the received category data. For example, in response to the category data related to the recognized attendee, the VCS 1 may transmit configuration data to the BCM 336. The configuration data to the BCM 336 may include ambient lighting settings, seat settings, and/or a combination thereof. In another example, the VCS may transmit configuration data 338 to the radio 307 and HVAC 313 control module to adjust climate settings and radio presets based on the recognized attendee.

In one example, a smartwatch 83 may receive a request to configure the one or more vehicle modules based on the calendar entry via a wireless communication connection with the VCS 1. The smartwatch 83 may transmit to the VCS 1 the calendar entry configuration based on the user input data. In another example, the nomadic device 53 may receive the request to configure from the smartwatch 83. The nomadic device 53 may transmit the response to the request to configure from the smartwatch 83 to the VCS 1.

Figure 4:
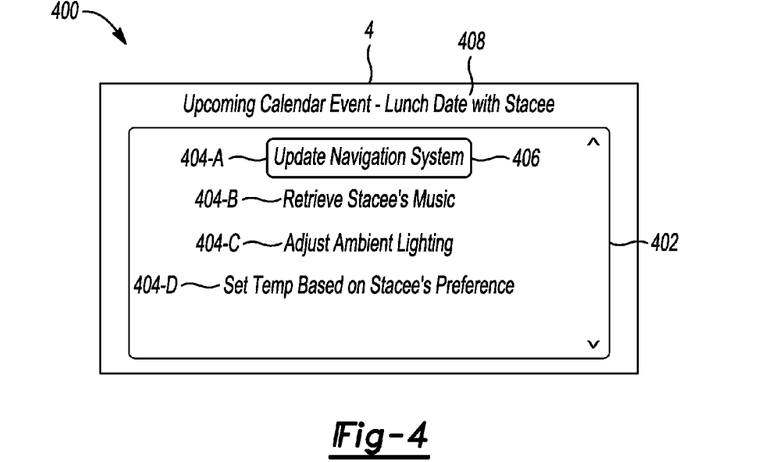
FIG. 4 illustrates an example of the vehicle computing system presenting a configuration option at a display based on the calendar entry according to an embodiment.

FIG. 4 illustrates a representative example of the VCS 1 presenting a configuration option at the display 4 based on the calendar entry. The user interface 400 may be presented at the touchscreen display 4 and may include a list control 402 configured to display selectable list entries 404-A through 404-E (collectively 404) of the one or more vehicle features based on the calendar entry. The VCS 1 may enable the occupant to scroll through each of the selectable list entries 404 based on a parsed calendar entry.

In response to one or more categories identified based on the parsed calendar entry, the VCS 1 may present the selectable list entries 404 at the display 4. The VCS 1 may highlight each of the one or more selectable list entries 404 that may be configured based on the calendar entry. The user interface 400 may also include a title label 408 to indicate to the user that the user interface 400 recognized the calendar entry for the occupant.

In response to the parsed calendar belonging to an occupant, the VCS 1 may recognize that a calendar entry for the occupant falls within a threshold for a predefined time window. The VCS 1 may output the upcoming calendar event to the display 4 based on the schedule time for the calendar entry falling within the predefined time window. In one example, the VCS 1 may calculate the predefined time window based on the amount of travel time from the current vehicle location to the destination (location, for example) entered in the calendar entry.

For example, the calendar entry may be entitled "Lunch Date with Stacee" and is scheduled for 12:30 P.M. The calendar entry may have a location of Baldo's Restaurant. The VCS 1 may request the current vehicle GPS coordinates to calculate the amount of travel time it may take to get to Baldo's Restaurant. The VCS 1 may configure one or more vehicle settings based on the calendar entry if the amount of travel time, in addition to the predefined time window, is equal to or exceeds the scheduled time for the calendar entry.

Continuing from the example above, the threshold for the predefined time window may be set to fifteen minutes before at least one of the scheduled calendar entry and the travel time associated with the scheduled calendar entry. For example, in response to the scheduled calendar entry being at 12:30 P.M. and the current time being 11:55 A.M., the VCS 1 may calculate that the travel time from the vehicle's current location to the location (Baldo's Restaurant, for example) is 20 minutes. Since the predefined time window is set to fifteen minutes, the VCS 1 may output the upcoming calendar event to the display based on the travel time associated with the calendar entry being within the predefined time window.

As illustrated in FIG. 4, the selectable list 402 of the calendar entry includes an entry 404-A for updating the navigation system, an entry 404-B for retrieving Stacee's music, an entry 404-C for adjusting ambient lighting, and an entry 404-D for setting a temperature based on Stacee's preference. The list control 402 may operate as a menu, such that an occupant may scroll through the list entries of the list control 402 (using up and down arrow buttons and a select button to invoke the selected menus item 406, for example).

For example, in response to the occupant selecting 406 the update navigation system entry 404-A, the VCS 1 may configure the navigation system based on the destination information parsed from the calendar entry. The destination information may include an address, business name, coordinates, uniform resource locator comprising a business name or address, and/or a combination thereof. The navigation system may receive the destination information from the calendar entry and output a route via the display 4.

The VCS 1 may search for the attendee's nomadic device (e.g., Stacee's nomadic device) based on the selection to retrieve Stacee's music entry 404-B. The VCS 1 may recognize the attendee's nomadic device based on a previous paired connection. In another example, in response to the retrieve Stacee's music entry 404-B, the VCS 1 may request Stacee's music stored in memory at the VCS, retrieve Stacee's information at a remote server, or a combination thereof. The retrieve Stacee's music entry 404-B may also include the adjustment of one or more radio presets.

Figure 5:
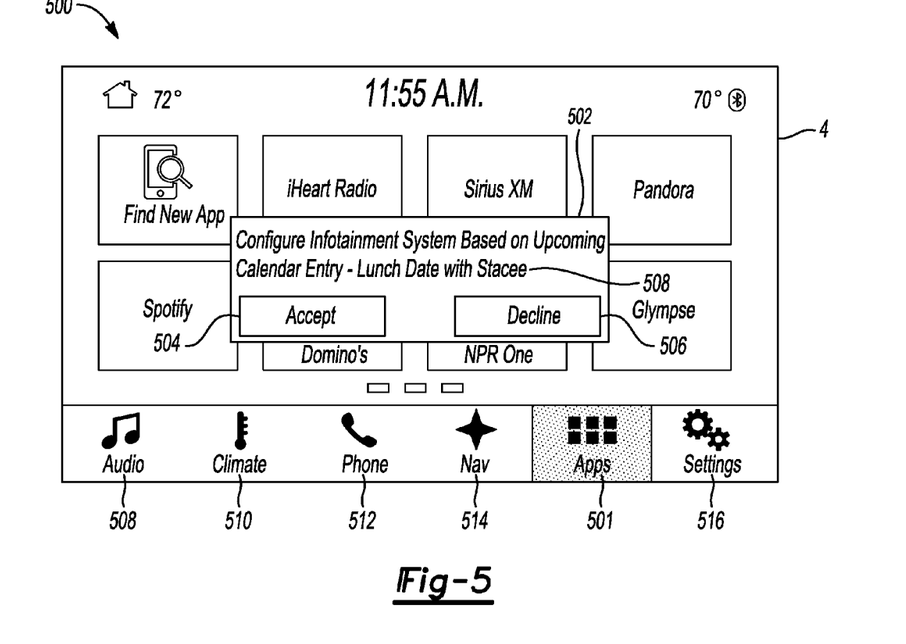
FIG. 5 illustrates an example of the vehicle computing system presenting the calendar entry configuration request according to an embodiment.

FIG. 5 illustrates a representative example of the VCS 1 presenting a calendar entry configuration request according to an embodiment. The VCS 1 may provide an infotainment system having one or more features and functions. The one or more features and functions may have vehicle setting input controls presented at the display 4. The vehicle setting input controls for the one or more features and function may include, but are not limited to, audio 508, climate 510, phone 512, navigation 514, applications 501, and miscellaneous infotainment settings 516.

The VCS 1 may retrieve a calendar belonging to the occupant and begin parsing the calendar for upcoming events that fall within the predefined time window. In response to the VCS 1 detecting an upcoming calendar entry, the system may output a configuration message 502 at the display 4. The configuration message may include the title 508 of the calendar entry and whether the occupant accepts 504 or declines 506 the configuration of the infotainment system.

The VCS 1 may identify one or more categories of the calendar entry. The VCS 1 may recognize the attendee for the calendar entry. The attendee is recognized by a user name, email address, unique code, profile name, etc. Continuing from the example above, the attendee is recognized as Stacee and may have profile settings stored at the VCS 1. The profile settings may include, but are not limited to, radio presets, music repository, preferred climate settings, seat settings, one or more mobile applications, and/or a combination thereof. The profile settings may be stored in memory at the VCS, at a nomadic device, and/or at a remote server 61. In one example, the VCS 1 may request communication with the nomadic device belonging to the attendee Stacee of the calendar entry. In response to the communication link with the attendee's nomadic device, the VCS 1 may recognize Stacee's nomadic device as the primary device. Therefore, one or more vehicle settings may be received from the attendee's nomadic device including, but not limited to, music.

The VCS 1 may configure one or more settings of the vehicle features and functions based on a received accept 504 option at the user interface display 4. The VCS 1 may adjust input controls based on the lunch date with Stacee. For example, the VCS 1 may roll up the windows and set the HVAC system temperature settings for the passenger side to a predefined temperate setting associated with the attendee (Stacee's profile settings may include temperate setting preferences based on the outside temperature, for example). In response to the occupant selecting the decline 506 option, the VCS 1 may continue to operate the one or more vehicle features and functions at the current vehicle settings.

Figure 6:
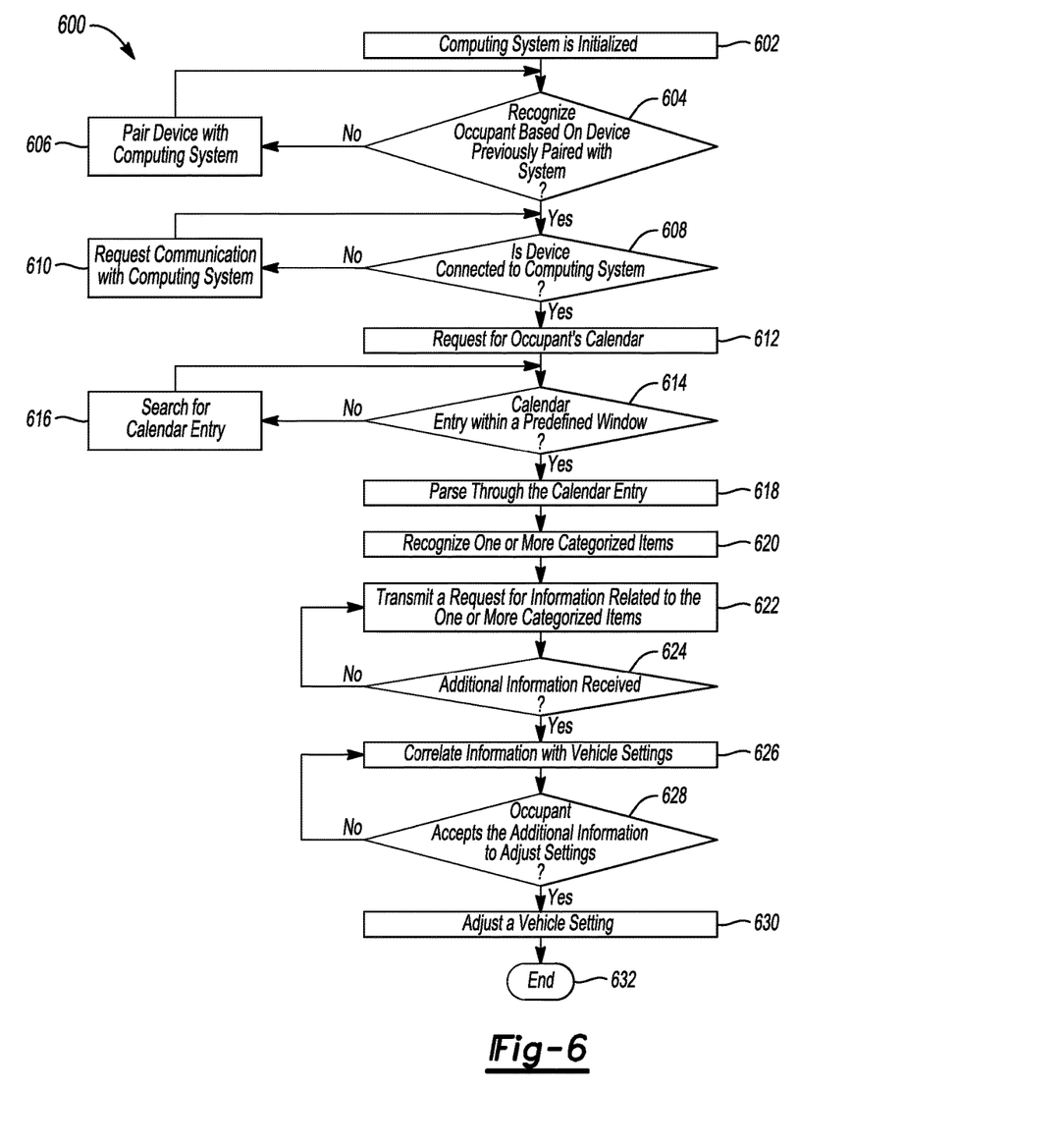
FIG. 6 is a flow chart illustrating an example method of the vehicle computing system adjusting vehicle settings based on the calendar entry according to an embodiment.

FIG. 6 is a flow chart illustrating an example method of the VCS 1 adjusting vehicle settings based on the calendar entry according to an embodiment. The method 600 may be implemented using software code contained within the nomadic device, wearable device, VCS, and a combination thereof.

Referring again to FIG. 6, the vehicle and its components illustrated in FIG. 1, FIG. 2, FIG. 3, FIG. 4 and FIG. 5 are referenced throughout the description of the method to facilitate understanding of various aspects of the present disclosure. The method 600 of configuring one or more vehicle features and/or functions based on a calendar entry may be implemented through a computer algorithm, machine executable code, or software instructions programmed into a suitable programmable logic device(s) of the vehicle, such as the vehicle control module, the nomadic device control module, smartwatch control module, another controller in communication with the vehicle computing system, or a combination thereof. Although the various operations shown in the flowchart diagram 600 appear to occur in a chronological sequence, at least some of the operations may occur in a different order, and some operations may be performed concurrently or not at all.

In operation 602, the VCS 1 may be initialized and enabled based on a key-on position or state of an ignition system. The VCS 1 may initialize one or more applications for execution. In response to the initialization of the VCS 1, the system may display the one or more applications at a user interface.

In operation 604, the VCS 1 may recognize an occupant using several methods including, but not limited to, a device previously paired with the system. In response to a recognized device not previously paired with the system, provide instructions to the occupant to pair the device with the VCS in operation 606.

In operation 608, the recognized device may establish communication with the VCS. In response to the device not connected to the VCS 1, transmit a request to the device to begin communicating with the system in operation 610.

In operation 612, the VCS 1 may request an occupant's calendar. For example, the calendar may be stored at the nomadic device, at the remote server, and/or a combination thereof. The VCS 1 may request calendar information within a predefined time window in operation 614. For example, the VCS 1 may be interested in all calendar entries from the current time to the impending 60 minutes. For example, if the current time is 11:55 A.M., the VCS 1 may parse the calendar for a calendar entry from 11:55 A.M. to 12:55 P.M. If the VCS 1 does not detect a calendar event within the predefined time window, the VCS 1 may continue to search for a calendar entry via a moving predefined time window in operation 616.

In operation 618, in response to a detected calendar entry, the VCS 1 may parse the entry. The VCS 1 may recognize one or more categorized items associated with the calendar entry in operation 620. In response to the recognized categorized items, the VCS 1 may transmit a request for information related to the items in operation 622. For example, if the location of the calendar entry is a business name, the VCS 1 may transmit a request to get additional information including the address associated with the business name from a remote server.

In operation 624, the VCS 1 may receive the additional information from at least one of a nomadic device, local memory, a remote server, and/or a combination thereof. The VCS 1 may correlate information with the respective vehicle settings in operation 626.

In operation 628, in response to the proposed adjusted setting based on the calendar entry, the VCS 1 may output an accept option to the occupant to adjust the settings. If the occupant accepts, the VCS 1 may adjust one or more vehicle settings based on the calendar entry in operation 630. In response to a key-off position of the ignition system, the VCS 1 may end the method of configuring one or more vehicle settings based on an occupant's calendar entries.

While representative embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle system comprising:
a processor in communication with a first nomadic device and programmed to:
receive calendar information from the first nomadic device;
parse the calendar information for a calendar entry based on a predefined time window;
adjust, by the processor, a vehicle setting for a vehicle feature associated with one or more categorized items correlated with the calendar entry;
communicate with a second nomadic device based on a unique user identification retrieved from the one or more categorized items; and
parse calendar information of the second nomadic device for the vehicle setting.

2. The vehicle system of claim 1, Wherein the one or more categorized items include at least one of an attendee, location, and subject of the calendar entry.

3. The vehicle system of claim 2, wherein the attendee is at least one of a recognized occupant, a recognized email address, a recognized nomadic device paired to the vehicle system, and a recognized user profile.

4. The vehicle system of claim 3, wherein the processor is further programmed to:
transmit a request for information related to the one or more categorized items; and
adjust radio presets as the vehicle setting based on the information associated with the recognized occupant.

5. The vehicle system of claim 2, wherein the location is at least one of a business name, URL, and address.

6. The vehicle system of claim 5, wherein the processor is further programmed to configure a destination input for a navigation system as the vehicle setting based on the at least one of the business name, URL, and address.

7. The vehicle computing system of claim 1, wherein the vehicle setting comprises vehicle ambient lighting and the processor is programmed to adjust the vehicle ambient lighting based on the calendar entry.

8. The vehicle system of claim 1, wherein the vehicle setting is at least one of climate control settings, seat settings, navigation system settings, radio settings, and ambient lighting settings.

9. The vehicle system of claim 1, wherein the predefined time window is based on a current time.

10. The vehicle system of claim 1, wherein the processor is further programmed to, in response to the calendar information, transmit a request for additional information related to the one or more categorized items and output a message at a vehicle display to provide an accept or decline option for adjusting the vehicle setting.

* * * * *